(12) United States Patent
Martin et al.

(10) Patent No.: US 7,359,975 B2
(45) Date of Patent: Apr. 15, 2008

(54) METHOD, SYSTEM, AND PROGRAM FOR PERFORMING A DATA TRANSFER OPERATION WITH RESPECT TO SOURCE AND TARGET STORAGE DEVICES IN A NETWORK

(75) Inventors: Howard Newton Martin, Tucson, AZ (US); David Michael Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/444,209

(22) Filed: May 22, 2003

(65) Prior Publication Data

US 2004/0236868 A1    Nov. 25, 2004

(51) Int. Cl.
*G06F 15/16* (2006.01)
*G06F 15/173* (2006.01)

(52) U.S. Cl. .................. 709/228; 709/242; 709/245

(58) Field of Classification Search .............. 709/203, 709/217, 218, 238, 245, 249, 250, 228, 242
See application file for complete search history.

(56) References Cited

U.S. PATENT DOCUMENTS

| | | | |
|---|---|---|---|
| 6,138,161 A | 10/2000 | Reynolds et al. | |
| 6,343,324 B1 | 1/2002 | Hubis et al. | |
| 6,400,730 B1 | 6/2002 | Latif et al. | |
| 6,446,141 B1 | 9/2002 | Nolan et al. | |
| 2002/0083240 A1 | 6/2002 | Hoese et al. | |
| 2002/0144046 A1 | 10/2002 | Hooper, III | |
| 2002/0144048 A1 | 10/2002 | Bolt | |
| 2003/0126225 A1* | 7/2003 | Camble et al. | 709/225 |
| 2004/0230704 A1* | 11/2004 | Balasubramanian et al. | 709/203 |

OTHER PUBLICATIONS

"Server-Free Backup/Restore", Crossroads Systems, Inc., 2001, pp. 1-5.
"Information Technology—SCSI Primary Commands—2(SPC-2)",dpANS, Project T10/1236-D, Jul. 18, 2001, pp. 43-80.
IBM Corporation, "IBM Tivoli Storage Manager for Windows Backup-Archive Clients Installation and User's Guide", [online] pp. 1-2 [Retrieved on Apr. 23, 2003]. Retrieved from the Internet at <URL: http://www.oucs.ox.ac.uk/hfs/tms/515/winc/ans60017.htm>.
A. MacFarland, et al."Explorer—Business Continuity Goes Better with SANS—the 3 Rs of Resilience", The Clipper Group, Inc., Jan. 25, 2002, pp. 1-8.
COMPAQ., "Guidelines for Open VMS Cluster Configurations" [online], pp. 1-13. [Retrieved on May 8, 2003]. Retrieved from the Internet at <URL: http://kuhub.cc.ku.edu/www/html/721final/6318/6318pro_008.html>.

(Continued)

*Primary Examiner*—Paul H. Kang
(74) *Attorney, Agent, or Firm*—David W. Victor; Konrad Raynes & Victor LLP

(57) ABSTRACT

Provided are a method, system, and program for performing a data transfer operation with respect to a source and target storage devices in a network, wherein storage devices in the network are assigned temporary network addresses. Device information is maintained and includes for each identified device a fixed address that does not change and a temporary network address. A data transfer request is received to transfer data between a source and target devices. The network is queried to determine changes to the temporary network addresses of the storage devices in response to receiving the data transfer request and the device information is updated to include any changed determined temporary network addresses for the storage devices. A data transfer command is constructed to transfer data between the source and target storage devices, wherein the data transfer command includes the temporary network addresses of the source and target devices in the device information.

30 Claims, 5 Drawing Sheets

OTHER PUBLICATIONS

Bill King, "Whitepapers—LUN Masking in a SAN", Fibre Channel Industry Association, [online] pp. 1-7 [Retrieved May 8, 2003]. Retrieved from the internet at <URL: http://data.fibrechannel-europe.com/technology/whitepapres/060202_12.html>.

"Storage Textual Conventions", Cisco Systems, Inc., [online] [retrieved May 8, 2003] 1992, pp. 1-4, http://www.cisco.com/univercd/cc/td/doc/product/sn5000/mds9000/1_13 0_2a/mibs/tc.htm.

"Tivoli Storage Manager Version 5.1 Technical Guide", IBM Corporation, Document No. SG24-6554-00, Jun. 2002.

* cited by examiner

Device Database Record

Backup Database Record

METHOD, SYSTEM, AND PROGRAM FOR PERFORMING A DATA TRANSFER OPERATION WITH RESPECT TO SOURCE AND TARGET STORAGE DEVICES IN A NETWORK

BACKGROUND OF THE INVENTION

1. Field of the Invention

The present invention is related to a method, system, and program for a data transfer operation with respect to source and target storage devices in a network.

2. Description of the Related Art

The Small Computer System Interface (SCSI) extended copy command allows one application in a network to issue a command to another device, referred to as the copy manager, to copy data from one set of source logical devices to another set of target logical devices, where the source and target logical devices may be separate from the system initiating the command. The extended copy command is issued to a copy manager that is responsible for copying data from the source device(s) to the destination device(s). Further details of the SCSI extended copy command are described in the publication "SCSI Primary Commands-2 (SPC-2)", Rev. 20, Reference No. ISO/IEC 14776-312 : 200x (Jul. 18, 2001), which publication is incorporated herein by reference in its entirety.

In a Fibre Channel Storage Area Network (SAN), each device is identified with a fixed identifier that does not change, such as a World Wide Name (WWN) assigned at the factory, and a temporary Fibre Channel static address assigned during initialization by the Fibre Channel fabric. If an administrator or program is unaware of these changes to the static Fibre Channel address of the device, then an extended copy operation using an invalid Fibre Channel address as the source or target device would result in an error. If the old incorrect address points to a different device than the one intended to be the source or target, then the wrong storage device would be involved in the copy operation. This could result in the unintended loss of important data by overwriting an unintended target storage device or copying an unintended source.

SUMMARY OF THE PREFERRED EMBODIMENTS

Provided are a method, system, and program for performing a data transfer operation with respect to a source and target storage devices in a network, wherein storage devices in the network are assigned temporary network addresses. Device information is maintained and includes for each identified device a fixed address that does not change and a temporary network address. A data transfer request is received to transfer data between a source and target devices. The network is queried to determine changes to the temporary network addresses of the storage devices in response to receiving the data transfer request and the device information is updated to include any changed determined temporary network addresses for the storage devices. A data transfer command is constructed to transfer data between the source and target storage devices, wherein the data transfer command includes the temporary network addresses of the source and target devices in the device information.

In further implementations, the network comprises a Fibre Channel network, the temporary network address comprises a Fibre Channel address, and the fixed address comprises a world wide name and logical unit number for the device.

Still further, the data transfer request may comprise a backup request to backup data from the source device to the target device. Alternatively, the data transfer request may comprise a restore request to restore backed-up data from the source device to the target device.

Described implementations provide techniques to perform a data transfer operation in a manner that minimizes the risks associated with specifying a wrong source or target address for the data transfer, including data errors and destruction of existing data.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
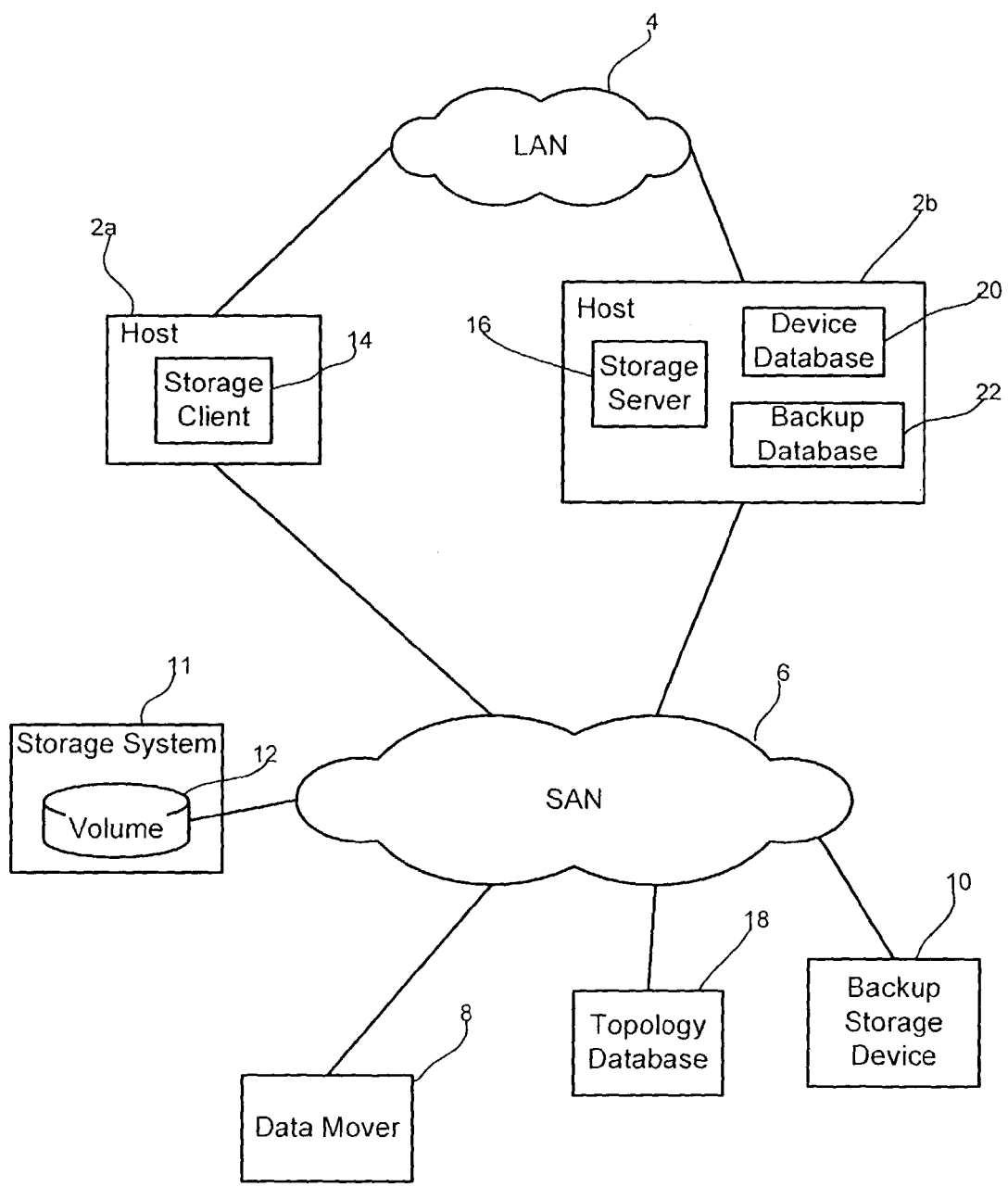
FIG. 1 illustrates a network computing environments in which aspects of the invention are implemented.

FIG. 1 illustrates a server-free network computing environment in which certain embodiments of the invention are implemented. Two host systems 2a, 2b, are connected to two networks, shown as a Local Area Network (LAN) 4, using the Ethernet protocol, and a Storage Area Network (SAN) 6, using the Fibre Channel protocol. In alternative implementations, networks and connections other than SAN and LAN may be used to implement the two networks 4, 6 to which the hosts 2a, 2b connect. A data mover 8, backup storage device 10, and storage system 11 on which logical volume 12 resides are shown as coupled to the SAN 6. The logical volume 12 may include user data. Host 2a includes a storage client 14 program to perform storage client operations, such as managing the backup and restore of data on volume 12. The host 2b includes a storage server 16 program to perform storage server operations in response to requests from multiple storage clients 14, such as managing the backup and restore of the data with respect to storage clients 14, discovering devices in the SAN 6, ensuring all the required paths defined between devices in the SAN 6 exist, mounting and positioning tape devices, recording information about the backup/restore operations in a database, etc. A topology database 18 is further coupled to the SAN 6 fabric and includes information on all the devices connected to the SAN 6, such as the Fibre Channel addresses, world wide names, LUN numbers, serial numbers, vendor identification, etc. The topology database 18, also known as the Fibre Channel name server, is created during initialization of the SAN 6 and devices coupled to the SAN 6 may access information in the topology database 18 to determine information about other devices connected to the SAN 6 with which they may communicate.

The host systems 2a, 2b may comprise any computing device known in the art, such as a server class machine, workstation, desktop computer, etc. The backup storage device 10 may comprise a mass storage device known in the art suitable for backing-up data, such as a tape storage device, e.g., a tape library, or one or more interconnected disk drives configured as a Redundant Array of Independent Disks (RAID), Just a Bunch of Disks (JBOD), Direct Access Storage Device (DASD), etc. The storage system 11 may comprise a mass storage device comprised of hard disk drives in any configuration, or another type of storage device. The data mover 8 may comprise a SAN data gateway, router or any other device suitable for moving data from one component to another in a network. The data mover 8 is capable of accessing the data in the volume 12. In further implementations, the data mover 8 may have alternative connections to the volume 12 or backup storage device 10, such as through a Small Computer System Interface (SCSI) connection separate from the SAN 6 or LAN 4. In certain implementations, the storage system 11 may include disk drive storage and the backup storage device 10 may be comprised of tape media or hard disk drives. The storage system 11 in which the volume 12 is configured may include additional volumes accessible to the SAN 6. Moreover, additional hosts, storage systems, backup storage systems, data movers, etc. may be coupled to the networks, and there may be additional networks therebetween.

The storage client 14 would initiate an operation to backup or restore data at the volume 12 by communicating the request for such operation to the storage server 16 via LAN 4. The storage server 16 would then prepare a copy command, such as the SCSI extended copy command, to perform the copy operation between the volume 12 and backup storage device 10 to implement the backup or restore operation, and send the copy command to the data mover 8 to perform the data copy operation. Further details of a server free backup are disclosed in the publication "IBM Tivoli Storage Manager Version 5.1: Technical Guide", document no. SG24-6554-00 (Copyright International Business Machines Corp., June 2002), which publication is incorporated herein by reference in its entirety.

To manage backup and restore operations, the storage server 16 maintains a device database 20 including information on each device in the SAN 6 with which the storage server 16 interfaces and a backup database 22 including information on backup data sets managed by the storage server 16.

Figure 2:
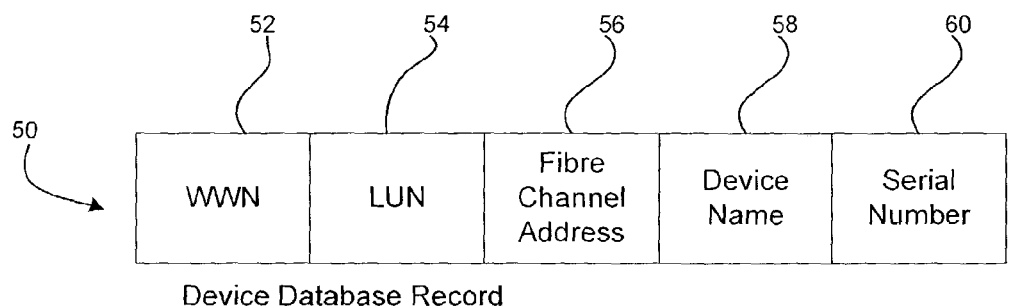
FIGS. 2 and 3 illustrate information included in a device database and backup database, respectively, in accordance with implementations of the invention.

FIG. 2 illustrates information that may be included in each record 50 in the device database 20 for each storage device and storage volume accessible to the storage server 16, including:

World Wide Name (WWN) 52: The world wide name is a unique identifier assigned by the manufacturer, usually 64 bits.

LUN 54: provides a logical unit name assigned to a logical device, where a storage system may have multiple LUNs. Each disk drive storage, which may include storage system 11, has a logical volume name, as well as LUNs.

Fibre Channel Address 56: A temporary address assigned automatically each time an interconnect initializes. A device may receive a new address each time a Fibre channel is reconfigured and reinitialized from the Fibre Channel component running the initialization routine.

Device Name 58: an arbitrary name assigned to the device, which may comprise a descriptive name.

Serial Number 60: A unique identifier assigned to the device by the manufacturer.

Figure 3:
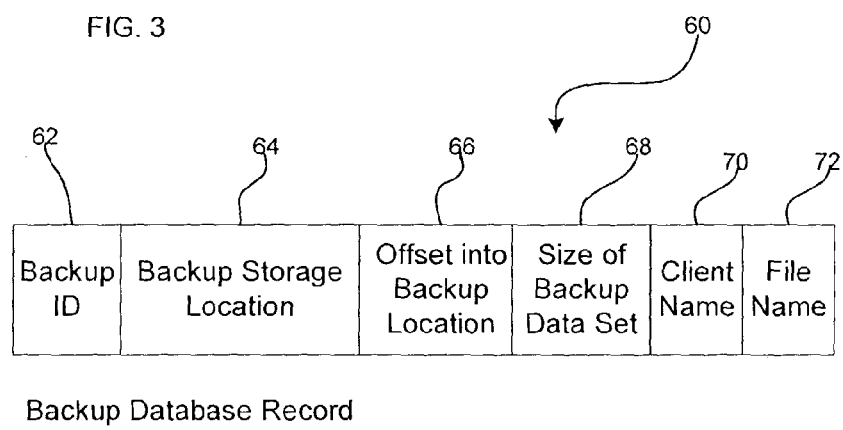

FIG. 3 illustrates information that may be included with each record 60 in the backup database 22 including information on backed-up data sets. Each backup record 60 includes:

Backup ID 62: a unique identifier of the record providing information on a backup.

Backup Storage Location 64: the logical volume name including the backed-up image or object. For instance, when the backup storage device 10 comprises a tape device, the backup data would be stored within one logical volume on the tape.

Offset Into Backup Location 66: an offset in units of bytes, fixed blocks, records or a file mark of the start of the backup data in the backup device.

Size of Backup Data Set 68: The number of bytes of the backed-up data.

Client Name 70: the name of the storage client 14 that initiated the backup operation, which may comprise the device name 58 (FIG. 2) assigned to the device.

File Name 72: a name of the file to backup, i.e., the identifier the client uses to access the data.

Figure 4:
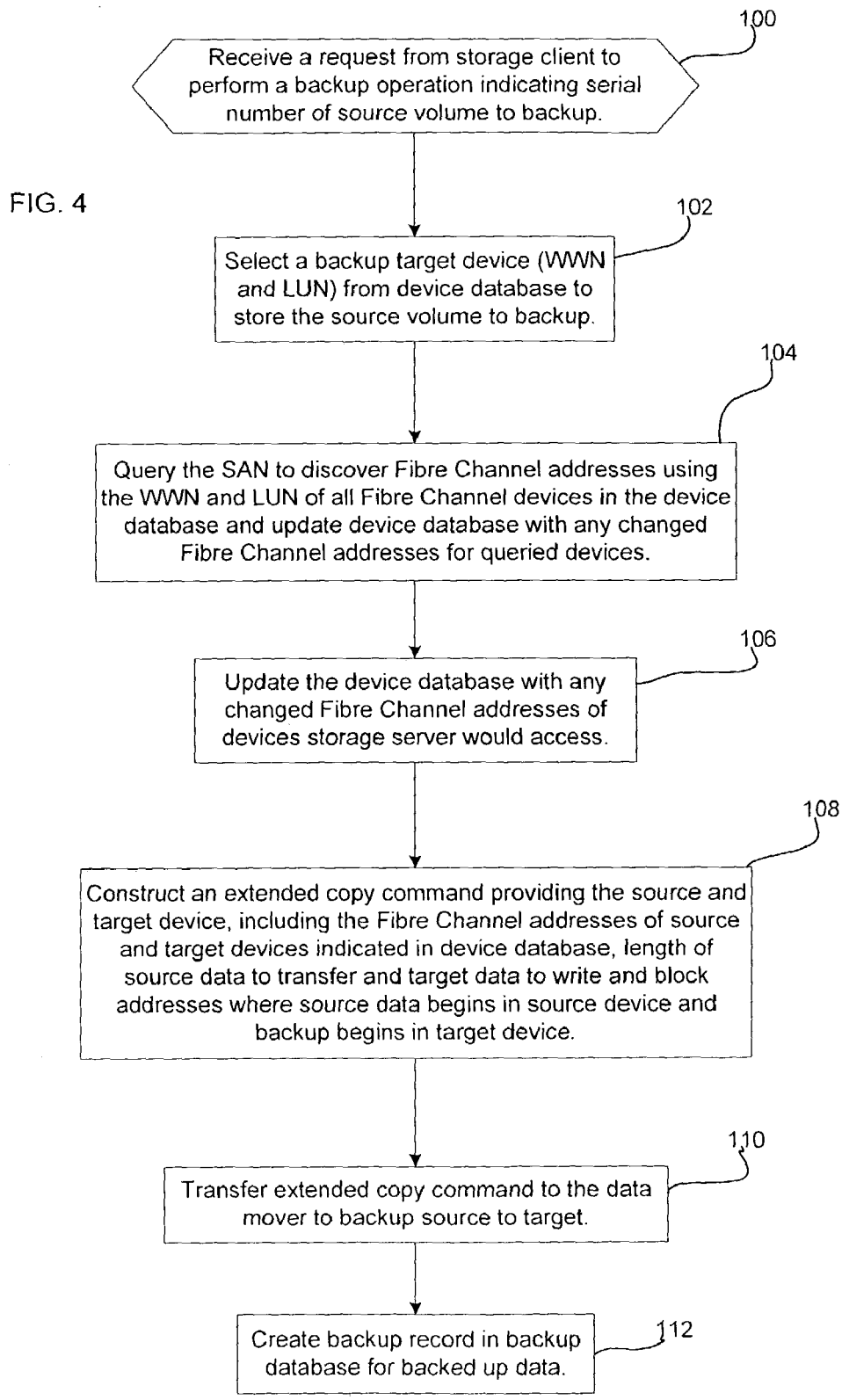
FIGS. 4 and 5 illustrate operations performed to backup and restore data, respectively, in a network environment in accordance with implementations of the invention.
Figure 5:
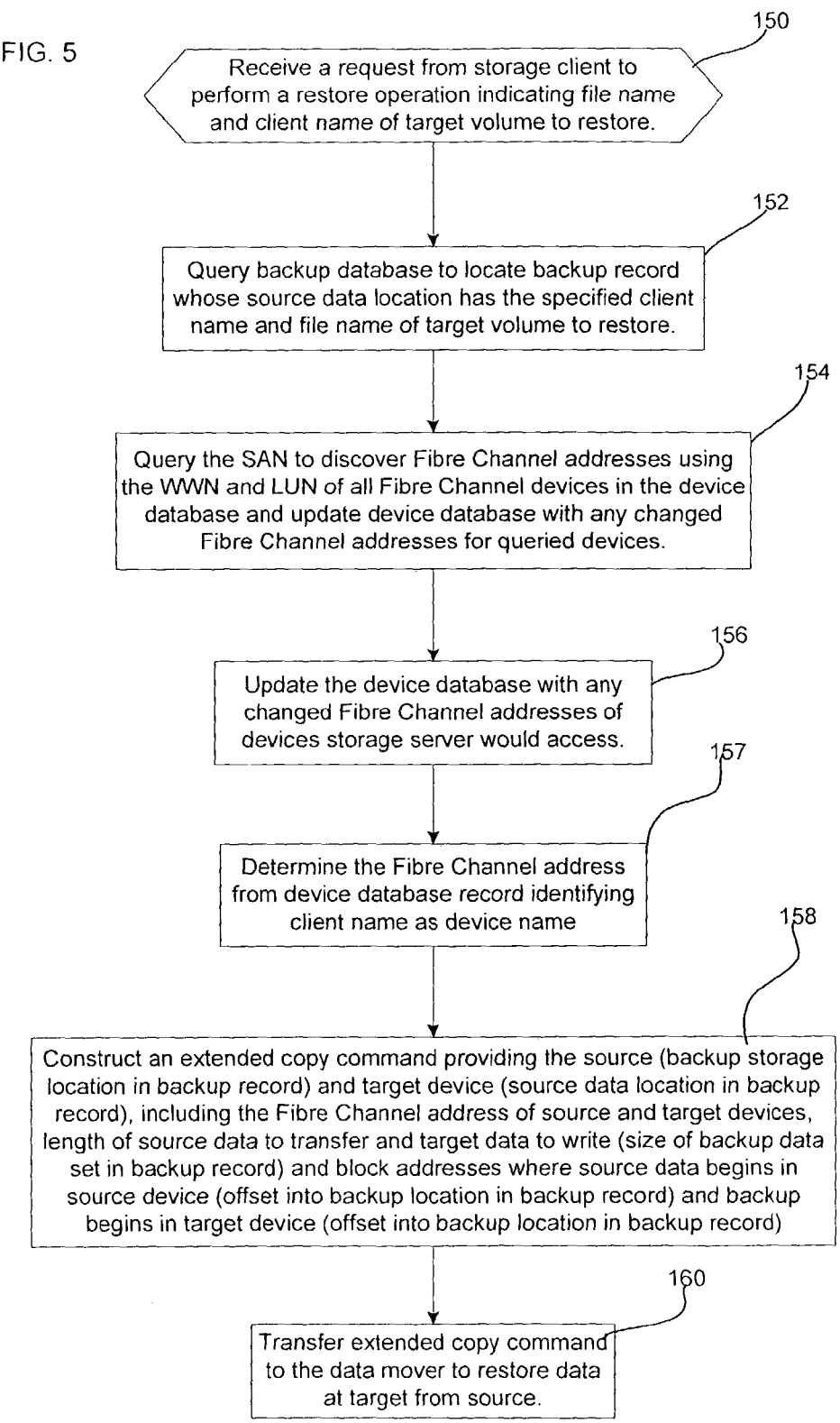

FIGS. 4 and 5 illustrate operations performed by the storage server 16 to perform backup and restore operations, respectively. With respect to FIG. 4, the backup operation would begin when the storage server 16 receives (at block 100) a backup request from one storage client 14, including the serial number 60 of the source volume to backup. This backup request may be communicated using a backup command implemented in the backup program providing the storage client 14 and server 16, such as the Tivoli® Storage Manager client and server. (Tivoli is a registered trademark of International Business Machines, Corp.) The storage server 16 would select (at block 102) a backup target device (WWN and LUN) from the device database 20, where the selected backup device may comprise one or more volumes from one or more backup storage devices 10 (e.g., tape devices), to store the source volume 12 being backed-up.

To ensure that the correct Fibre Channel address is used with the copy command to perform the backup operation, the storage server 16 would query (at block 104) the SAN 6 using Fibre Channel discovery commands to rediscover the Fibre Channel addresses for the WWN and LUN of all Fibre Channel devices in the device database 20 and update (at block 106) device records 50 (FIG. 2) in the device database 20 with any changed Fibre Channel addresses determined from the discovery.

The storage server 16 then constructs (at block 108) an extended copy command specifying the source (the requested volume to backup) and the target device (the selected backup volume). To identify the source and target volumes in the extended copy command, the storage server 16 may include the Fibre Channel addresses of the source and target devices indicated in the device database 20, the length of the source data to transfer and target data to write, which is the length of the image to backup, and the block addresses where the source data begins in the source device 12 and the backup begins in target device 10. If the backup storage location is in a tape device, then the block address of where to write the backup image may comprise a record or file mark number. The extended copy command may include additional information on the source and target locations, such as the WWN and LUN number, as well as other information and parameters.

The storage server 16 transfers (at block 110) the extended copy command to the data mover 8 to copy the specified data at the source volume 12 to the specified target volume in the backup storage device 10. A backup record would be added (at block 112) to the backup database 22 providing information on the backed-up data set, including the location of the source 70 and target 64, length of backup 68, and offsets into source 72 and target 66 storage devices (FIG. 3) where the backup data is stored.

FIG. 5 illustrates the operations the storage server 16 performs to accomplish a restore operation. The storage client 14 would transmit a restore request to the storage server 16 including a file name and client name of the volume to restore. In response (at block 150) to receiving such restore request, the storage server 16 would query (at block 152) the backup database 22 to locate the backup record 60 having the client name 70 of the storage client 14 that initiated the request and the specified file name 72. To ensure that the correct Fibre Channel address is used with the copy command to perform the restore operation, the storage server 16 would query (at block 154) the SAN 6 using Fibre Channel discovery commands to rediscover the Fibre Channel addresses for the WWN, LUN, and/or serial number of all Fibre Channel devices in the device database 20 and update (at block 156) device records 50 (FIG. 2) in the device database 20 with any changed Fibre Channel addresses for those rediscovered Fibre Channel devices.

The storage server 16 then determines (at block 157) the Fibre Channel address 56 from the device database record 50 identifying the client name in the restore request in the device name field 58. The storage server 16 then constructs (at block 158) an extended copy command specifying the source (backup storage location in backup record) and target device (the determined Fibre Channel address of device having client name of device to restore). The source and target devices specified in the extended copy command would be identified by the Fibre Channel address 54 of source and target devices indicated in the device records 50 in the device database 20 of the target specified in the restore request and the source identified in the backup storage location field 64 of the located backup record 60. The extended copy command may further include as parameters the length of the source data to transfer and target data to write, which is the size 68 of the backup data set in the located backup record 60 (FIG. 3); block address where the source backup data to restore begins in the source device, which is the offset into the backup location 66 in the located backup record 60; and block address where the restore begins in the target device, which is the offset into the source data location in backup record 72. If the backup storage location to restore is in a tape device, then the block address of where to restore the backup image may comprise a record or file mark number. The extended copy command may include additional information on the source and target locations, such as the WWN and LUN number, as well as other information and parameters. The storage server 16 then transfers (at block 160) the generated extended copy command to the data mover 8 to copy the specified data at the backup storage device 10 to the target volume 12 being restored.

With the described implementations, before performing an extended copy backup or restore, which offloads the data movement from the storage server to a data mover device, the Fibre Channel addresses are confirmed so that the current and correct Fibre Channel address are specified in the extended copy command. This avoids any errors or destruction of existing data that would result from using an invalid Fibre Channel address.

Additional Implementation Details

The backup and restore operations described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, the network across which the backup and restore occurred comprised a Fibre Channel SAN network. In alternative implementations, the network may comprise any type of network known in the art that assigns temporary network addresses to the devices coupled to the network. In such additional implementations, the storage server would have to confirm the temporary network address using fixed identification information before initiating the data movement operation to avoid invalid address errors.

In the described implementations, the SCSI-3 Extended Copy Command was used to transfer data between devices. In alternative implementations, other commands in alternative formats may be used to perform the device-to-device copy operations described herein.

In the described implementations, the address checking and extended copy command was used to perform a restore or backup operation. In additional implementations, the extended copy command of the described embodiments may be used for any other type of data transfer operation known in the art to transfer data between volumes.

In described implementations, the storage client would specify the user data volume to backup and restore, and the storage server would then determine the backup location to use for the backup or restore. In alternative implementations, the storage client may specify both the user data volume and backup location to use in the backup or restore operation. Still further, to perform a restore, the storage client may specify the backup record in the backup database, which would provide the source and target of the restore.

In the described implementations, the fixed address or identifier of the network devices comprises the WWN, LUN, and serial number. In alternative implementations, other device information may be used to provide a fixed, permanent address of the devices, such as a serial number and vendor information.

In the described implementations, when rediscovering the Fibre Channel addresses, the storage server would check all the Fibre Channel addresses in the device database. In alternative implementations, the storage server may only rediscover the Fibre Channel addresses of the volumes that are the source and target of the extended copy command.

FIGS. 4 and 5 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 6:
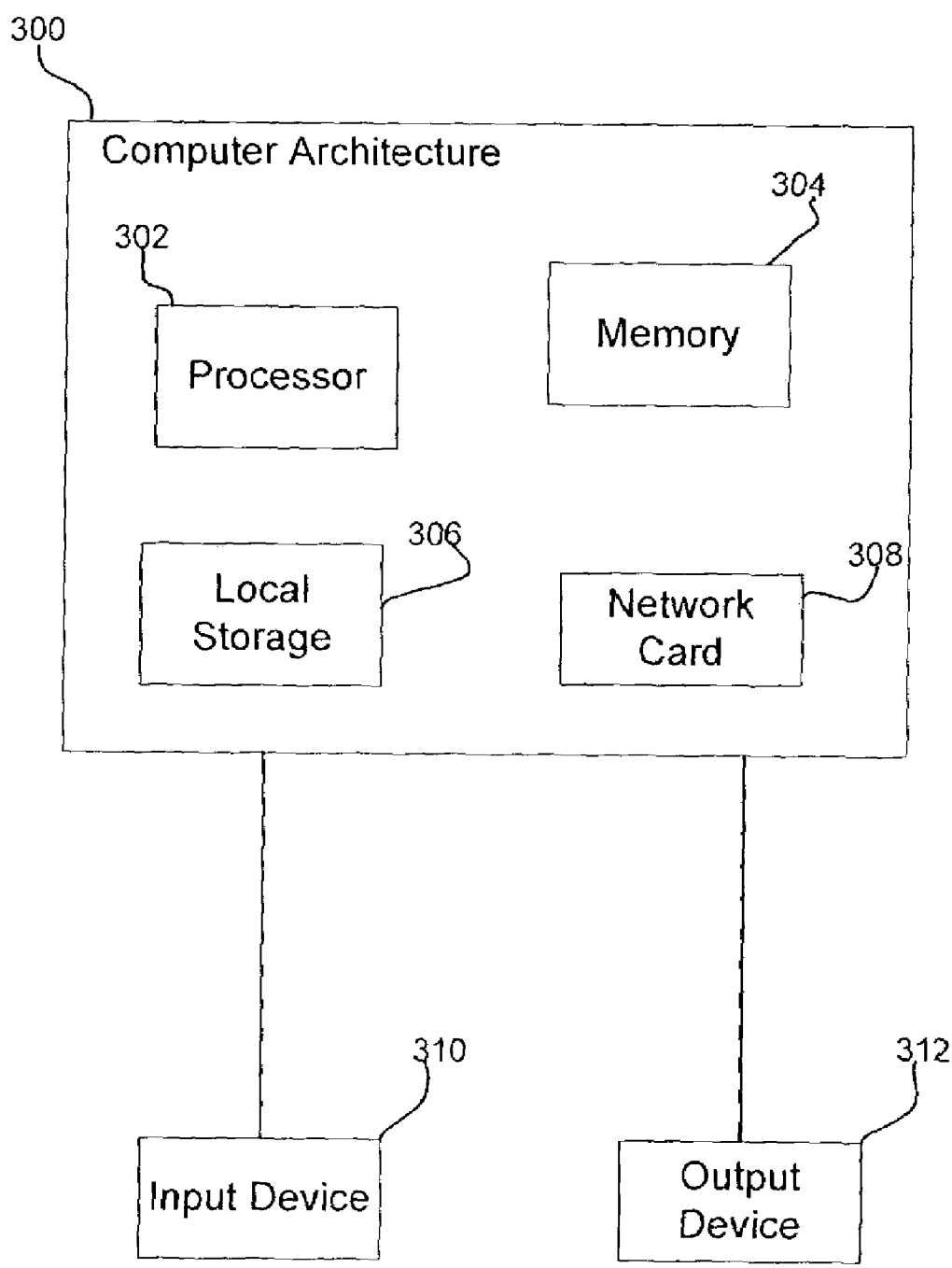
FIG. 6 illustrates a computing architecture that may be used to implement the network components described with respect to FIG. 1.

FIG. 6 illustrates one implementation of a computer architecture 300 of the network components shown in FIG. 1, such as the host, data mover, storage device, etc. The architecture 300 may include a processor 302 (e.g., a microprocessor), a memory 304 (e.g., a volatile memory device), and local storage 306 (e.g., a nonvolatile storage, such as magnetic disk drives, optical disk drives, a tape drive, etc.). The local storage 306 may comprise an internal storage device or an attached or network accessible storage. Programs in the local storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for performing a data transfer operation with respect to a source and target storage devices in a network, wherein storage devices in the network are assigned temporary network addresses, comprising:
   maintaining device information including for each identified device a fixed address that does not change and a temporary network address;
   receiving a data transfer request to transfer data between the source and target devices;
   querying the network to determine changes to the temporary network addresses of the storage devices in response to receiving the data transfer request;
   receiving a response to the query including any changed temporary network addresses;
   updating the device information to include any changed temporary network addresses for the storage devices indicated in the response to the query; and
   constructing a data transfer command to transfer data between the source and target storage devices, wherein the data transfer command includes the temporary network addresses of the source and target devices in the device information.

2. The method of claim 1, further comprising:
   sending the data transfer command to a data mover to transfer the data from the source device to the target device volume.

3. The method of claim 1, wherein the network is queried to determine changes to the temporary network addresses of all devices indicated in the device information before constructing the data transfer command.

4. The method of claim 1, wherein the temporary network addresses are updated in the device information due to a change in a network configuration.

5. The method of claim 1, wherein the network comprises a Fibre Channel network, wherein the temporary network address comprises a Fibre Channel address, and wherein the fixed address comprises a world wide name and logical unit number for the device.

6. The method of claim 1, wherein the storage device comprises a logical volume representing a physical storage media.

7. The method of claim 1, wherein the data transfer request comprises a backup request to backup data from the source device to the target device.

8. The method of claim 7, wherein the backup request identifies a source volume to backup, further comprising:
   selecting one storage device identified in the device information to be the target device to store a backed-up source volume; and
   adding an entry to a backup database indicating the backed-up source volume and the source and target storage devices.

9. The method of claim 1, wherein the data transfer request comprises a restore request to restore backed-up data from the source device to the target device.

10. The method of claim 9, wherein the restore request identifies a file name and device name to restore, further comprising:
    maintaining a backup database indicating file names backed-up and a backup storage device storing the backed-up data;
    determining a storage device to restore having the device name identified in the restore request; and
    processing the backup database to locate information on the backup storage device storing the file name to restore, wherein the source device comprises the determined backup storage device and the target device comprises the storage device to restore.

11. A system for performing a data transfer operation with respect to a source and target storage devices in a network, wherein storage devices in the network are assigned temporary network addresses, comprising:
    device information including for each identified device a fixed address that does not change and a temporary network address;
    a storage server enabled to cause operations to be performed, the operations comprising:
       receiving a data transfer request to transfer data between the source and target devices;
       querying the network to determine changes to the temporary network addresses of the storage devices in response to receiving the data transfer request;
       updating the device information to include any changed determined temporary network addresses for the storage devices; and
       constructing a data transfer command to transfer data between the source and target storage devices, wherein the data transfer command includes the temporary network addresses of the source and target devices in the device information.

12. The system of claim 11 further in communication with a data mover, wherein the operations further comprise:
    sending the data transfer command to the data mover to transfer the data from the source device to the target device volume.

13. The system of claim 11, wherein the querying of the network queries the network to determine changes to the temporary network addresses of all devices indicated in the device information before constructing the data transfer command.

14. The system of claim 11, wherein the temporary network addresses are updated in the device information due to a change in a network configuration.

15. The system of claim 11, wherein the network comprises a Fibre Channel network, wherein the temporary network address comprises a Fibre Channel address, and wherein the fixed address comprises a world wide name and logical unit number for the device.

16. The system of claim 11, wherein the storage device comprises a logical volume representing a physical storage media.

17. The system of claim 11, wherein the data transfer request comprises a backup request to backup data from the source device to the target device.

18. The system of claim 17, wherein the backup request identifies a source volume to backup, wherein the operations further comprise:
   selecting one storage device identified in the device information to be the target device to store a backed-up source volume; and
   adding an entry to a backup database indicating the backed-up source volume and the source and target storage devices.

19. The system of claim 11, wherein the data transfer request comprises a restore request to restore backed-up data from the source device to the target device.

20. The system of claim 19, wherein the restore request identifies a file name and device name to restore, further comprising:
   a backup database indicating file names backed-up and a backup storage device storing the backed-up data;
   wherein the operations further comprise:
      determining a storage device to restore having the device name identified in the restore request; and
      processing the backup database to locate information on the backup storage device storing the file name to restore, wherein the source device comprises the determined backup storage device and the target device comprises the storage device to restore.

21. An article of manufacture for performing a data transfer operation with respect to a source and target storage devices in a network, wherein storage devices in the network are assigned temporary network addresses, wherein the article of manufacture causes operations to be performed, the operations comprising:
   maintaining device information including for each identified device a fixed address that does not change and a temporary network address;
   receiving a data transfer request to transfer data between the source and target devices;
   querying the network to determine changes to the temporary network addresses of the storage devices in response to receiving the data transfer request;
   receiving a response to the query including any changed temporary network addresses;
   updating the device information to include any changed temporary network addresses for the storage devices indicated in the response to the query; and
   constructing a data transfer command to transfer data between the source and target storage devices, wherein the data transfer command includes the temporary network addresses of the source and target devices in the device information.

22. The article of manufacture of claim 21, wherein the operations are further enabled to communicate with a data mover and further comprise:
   sending the data transfer command to the data mover to transfer the data from the source device to the target device volume.

23. The article of manufacture of claim 21, wherein the network is queried to determine changes to the temporary network addresses of all devices indicated in the device information before constructing the data transfer command.

24. The article of manufacture of claim 21, wherein the temporary network addresses are updated in the device information due to a change in a network configuration.

25. The article of manufacture of claim 21, wherein the network comprises a Fibre Channel network, wherein the temporary network address comprises a Fibre Channel address, and wherein the fixed address comprises a world wide name and logical unit number for the device.

26. The article of manufacture of claim 21, wherein the storage device comprises a logical volume representing a physical storage media.

27. The article of manufacture of claim 21, wherein the data transfer request comprises a backup request to backup data from the source device to the target device.

28. The article of manufacture of claim 27, wherein the backup request identifies a source volume to backup, wherein the operations further comprise:
   selecting one storage device identified in the device information to be the target device to store a backed-up source volume; and
   adding an entry to a backup database indicating the backed-up source volume and the source and target storage devices.

29. The article of manufacture of claim 21, wherein the data transfer request comprises a restore request to restore backed-up data from the source device to the target device.

30. The article of manufacture of claim 29, wherein the restore request identifies a file name and device name to restore, wherein the operations further comprise:
   maintaining a backup database indicating file names backed-up and a backup storage device storing the backed-up data;
   determining a storage device to restore having the device name identified in the restore request; and
   processing the backup database to locate information on the backup storage device storing the file name to restore, wherein the source device comprises the determined backup storage device and the target device comprises the storage device to restore.

* * * * *